United States Patent [19]

Motz

[11] Patent Number: 5,580,153
[45] Date of Patent: Dec. 3, 1996

[54] VEHICLE LIGHTING APPARATUS

[75] Inventor: Anthony P. Motz, Farmington Hills, Mich.

[73] Assignee: United Technologies Automotive, Inc., Dearborn, Mich.

[21] Appl. No.: 473,174

[22] Filed: Jun. 7, 1995

[51] Int. Cl.⁶ ........................................ B60Q 1/00
[52] U.S. Cl. ........................... 362/80; 362/80.1
[58] Field of Search ............. 362/61, 80, 80.1, 362/83.3; 340/479

[56] References Cited

U.S. PATENT DOCUMENTS

| | | | |
|---|---|---|---|
| 2,054,919 | 9/1936 | Anibal | 362/80 X |
| 2,128,679 | 8/1938 | Kielian | 362/80 X |
| 3,582,639 | 6/1971 | Chamberlain | |
| 4,449,167 | 5/1984 | Cohen | 362/269 |
| 4,731,708 | 3/1988 | Gonas | 362/80 |
| 4,896,136 | 1/1990 | Hotovy | 362/80.1 |
| 5,089,805 | 2/1992 | Salsman | 340/467 |

Primary Examiner—Stephen F. Husar
Attorney, Agent, or Firm—William W. Habelt

[57] ABSTRACT

A combination brake light and trunk storage region illumination lamp is provided for use in an automobile as (20) a center high mount lamp (10) or a trunk mounted lamp (310). The lamp comprises a housing (30) having a first wall (32) having a first lens (50) mounted in an opening (52) and a second wall (34) having a second lens (60) mounted in an opening (62). The housing (30) is mounted to the automobile (20) on a support member, such as the package shelf (40) or the trunk lid (240), whereby the first lens (50), which is a red lens, is disposed so as to be visible from behind the vehicle and the second lens (60), which is a clear or neutral color lens, is disposed so as to face into the trunk storage region. Disposed within the housing (30) is a lighting element (35) which is selectively energized either when a brake pedal of the automobile (20) is depressed or when the trunk lid is in an open position.

4 Claims, 2 Drawing Sheets

VEHICLE LIGHTING APPARATUS

TECHNICAL FIELD

The present invention relates generally to vehicle lighting in general and, more particularly, to a lighting apparatus operative both for signalling that the vehicle is braking and for illuminating the trunk space of an automobile when the trunk lid is in the open position.

BACKGROUND ART

Motor vehicles are equipped with brake light systems that are operative to provide a visual signal to other motorists that the vehicle is decelerating through application of the vehicle brakes. In an effort to make brake lights more conspicuous, many models of automobiles are equipped with a center mount brake light. In one common embodiment of a center mount brake light, the brake light is mounted on the package shelf in the interior of a passenger car behind the rear seat under the rear window and is disposed along the centerline of the vehicle. In another common embodiment of a center mount brake light, the brake light is mounted on the upper exterior surface of the trunk lid and is again disposed along the centerline of the vehicle. Center mount brake lights, which are used in conjunction with the standard brake lights which are mounted in the rear fenders and occasionally in the rear lip of the trunk lid, provide an additional brake light signal which is presented closer to the eye level of the drivers of trailing vehicles. Conventional center mount brake lights are operative only for providing a visual signal indicative of vehicle braking and do not perform an auxiliary lighting function.

Most automobiles are equipped with a trunk for storage purposes. Most often, the trunk is located aft of the rearward-most seat and is provided with a hinged lid which in its closed position covers the storage area and in its open position opens the storage area to access from the outside. To facilitate visibility in the trunk storage area, particularly in the evening after dusk and at night, auxiliary lighting is required for illuminating the trunk storage area. Typically, a separate, independent trunk illumination lamp is provided for this purpose, the lamp being energized whenever, and only whenever, the trunk lid is open. Commonly, such trunk illumination lamps are mounted in the forward portion of the trunk on the underside of the package tray or on the underside of the trunk lid. Additional auxiliary lighting is also provided on automobiles to illuminate the license plate to improve its visibility. Conventionally, such license plate lighting is provided by separate, independent lamps disposed adjacent the perimeter of the license plate and operative whenever, and only whenever, the running lights with or without the headlights of the automobile are turned on.

SUMMARY OF THE INVENTION

It is an object of the present invention to provide a vehicle lighting apparatus which is operative not only to provide a visual signal indicative of vehicle braking, but is also operative to provide an auxiliary lighting function, in particular illuminating the trunk storage area of the vehicle.

It is a further object of a particular embodiment of the present invention to provide a center mount brake light for an automobile which is mounted on the package shelf in the interior of the automobile behind the rear seat under the rear window and over a forward portion of the trunk storage area, and is operative not only to provide a visual signal indicative of vehicle braking, but is also operative to provide an auxiliary lighting function, in particular illuminating the trunk storage area of the vehicle.

It is a further object of another embodiment of the present invention to provide a high mount brake light for an automobile which is mounted on the upper exterior surface of the trunk lid of the automobile and over a portion of the trunk storage area covered by the trunk lid, and is operative not only to provide a visual signal indicative of vehicle braking, but is also operative to provide an auxiliary lighting function, in particular illuminating the trunk storage area of the vehicle.

According to one aspect of the present invention, a lighting apparatus is provided for use on a motor vehicle having a storage region, the lighting apparatus comprising a housing enclosing a lighting element, a first lens disposed in the housing in a first plane and facing outwardly of the motor vehicle, and a second lens disposed in the housing in a second plane and facing inwardly of the motor vehicle. Advantageously, the lighting element and the first lens, which is a red color lens, comprise in combination a brake lamp for providing a visual signal indicative of vehicle braking, and the lighting element and the second lens, which is preferably a clear or neutral color lens, comprise in combination an illumination lamp for illuminating the storage region of the vehicle.

In accordance with another aspect of the present invention, a lighting apparatus is provided for use in an automobile having a rearwardly disposed, enclosed trunk storage region, a trunk lid disposed over the trunk storage region when in a closed position and moveable from the closed position to an open position to provide access to the trunk storage region. The lighting apparatus comprises a housing having a first wall having an opening and a first lens mounted therein and a second wall having an opening and a second lens mounted therein. The housing is mounted to the vehicle on a support member whereby the first lens, which is a red lens, is disposed so as to be visible from behind the vehicle and the second lens, which advantageously is a clear or neutral color lens, is disposed so as to face into the trunk storage region. Disposed within the housing is a lighting element which is selectively energized either when a brake pedal of the automobile is depressed or when the trunk lid is in an open position.

In accordance with one embodiment of the lighting apparatus of the present invention, the housing of the lighting apparatus is mounted to a package tray disposed within the passenger cabin of the automobile rearwardly adjacent the rearward-most seat and above a forward portion of the enclosed trunk storage region disposed rearwardly of the rearward-most seat. The housing of the lighting apparatus is mounted to an upper surface of the package tray over an opening in the package tray. The first lens is disposed in an opening in a first wall of the housing facing rearwardly of the vehicle and disposed above the package tray, and the second lens is disposed in an opening in a second wall of the housing facing downwardly and disposed over an opening in the package tray above a forward portion of the trunk storage region.

In accordance with another embodiment of the lighting apparatus of the present invention, the housing of the lighting apparatus is mounted to an upper exterior surface of the trunk lid of the automobile above a portion of the enclosed trunk storage region. The first lens is disposed in an opening a first wall of the housing facing rearwardly and disposed above the trunk lid, and the second lens is disposed in an opening in a second wall of the housing facing downwardly and over an opening in the trunk lid disposed over the trunk storage region.

BRIEF DESCRIPTION OF THE DRAWINGS

The present invention will be described herein with reference to the drawings wherein.

DETAILED DESCRIPTION OF THE PREFERRED EMBODIMENTS

Figure 1:
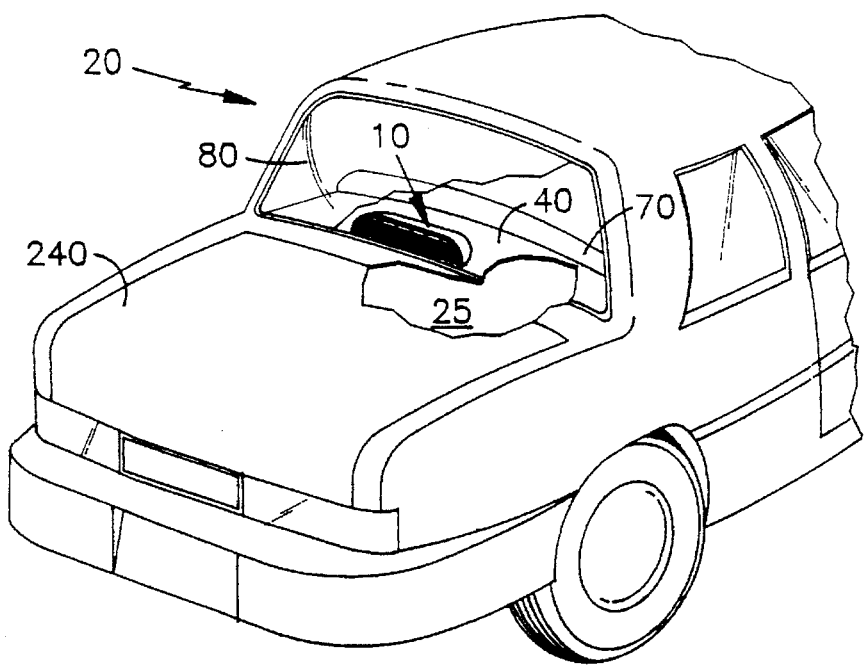
FIG. 1 is a perspective view of the rear portion of a vehicle illustrating one embodiment of the lighting apparatus of the present invention installed on the vehicle as a high mount combination brake/trunk illumination lamp.

The invention will be described herein as applied to a passenger type automobile. It is to be understood, however, that the invention is generally applicable to various types of automobiles and motor vehicles and is not limited to the embodiments illustrated in the drawings.

Referring now to the drawings in general, there is depicted therein a lighting apparatus 10 for use in connection with a vehicle 20, for example an automobile, having a storage region 25, commonly referred to as a trunk. In accordance with the present invention, the lighting apparatus 10 is operative both to provide a visual signal to trailing drivers that the vehicle is braking and to illuminate the trunk storage region 25. The lighting apparatus 10 may also be referred to herein as a combination brake/trunk illumination lamp or simply as a combination lamp.

Figure 2:
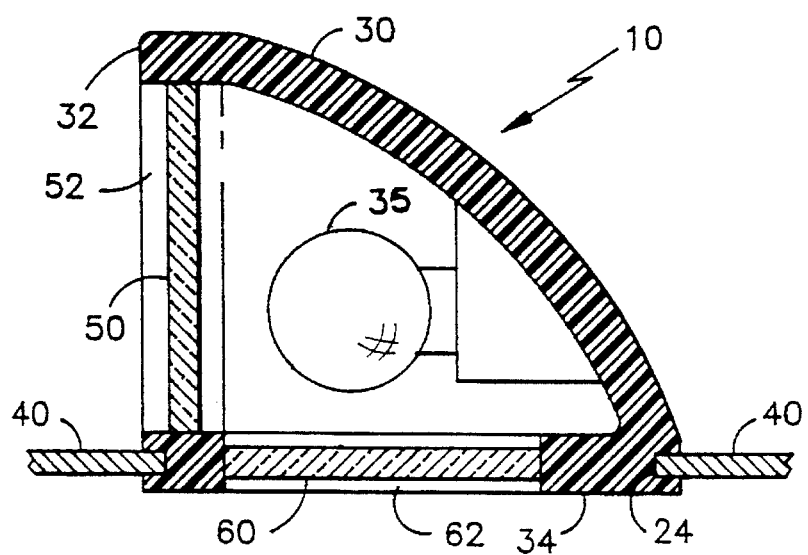
FIG. 2 is a sectional side elevation view of the combination brake/trunk illumination lamp of the present invention.

Referring now to FIGS. 1 and 2 in particular, the lighting apparatus 10 comprises a housing 30 enclosing a lighting element 35, which may be any conventional lighting means, for example an incandescent bulb, and mounted to a support surface 40 of the vehicle 20 over an opening 24 in the support surface 40 which opens into the trunk storage region 25 of the vehicle 20. A first lens 50 is disposed in the housing 30 in an opening 52 in a first wall 32 extending in a first plane so as to face outwardly of the motor vehicle 20. A second lens 60 is disposed in the housing 30 in an opening 62 in a second wall 34 in a second plane so as to face inwardly of the motor vehicle 20.

Advantageously, the lighting element 35 is selectively energized when either the vehicle brake is depressed or the vehicle trunk lid is opened to gain access to the trunk storage region 25.

Therefore, the lighting element 35 and the first lens 50, which is a red color lens, comprise in combination a brake lamp for providing a visual signal indicative of vehicle braking, and the lighting element 35 and the second lens 60, which is preferably a clear or neutral color lens, comprise in combination a lighting lamp for illuminating the trunk storage region 25 of the vehicle. Thus, the lighting apparatus 10 when installed on a vehicle provides a combination brake/trunk lamp (designated as 10 in FIG. 1 and 310 in FIG. 3) which serves the dual function of providing a visual signal indicative of vehicle braking, as does any conventional center mount brake lamp, and also of providing a trunk courtesy light for illuminating the interior of the trunk storage region.

In the embodiment depicted in FIG. 1, the combination lamp 10 is disposed within the interior cabin of the automobile 20 and, as a conventional center high mount stop light, is mounted to the package tray 40. The enclosed trunk storage region 25 is disposed rearwardly of the rearward-most seat 70. The package tray 40 extends across the width of the vehicle 20 rearwardly adjacent the rearward-most seat 70 of the vehicle beneath the rear window 80 and above a forward portion of the trunk storage region 25. A trunk lid 240 is movably mounted, typically in a hinged manner, to the automobile so as to be disposed over the trunk storage region 25 when in a closed position and be moveable from the closed position to an open position to provide access to the trunk storage region 25.

The housing 30 of the combination lamp 10 is mounted over an opening in the package tray 40 so that the second lens 60 faces downwardly into the trunk storage region 25 and the first lens 50 extends above the upper surface of the package tray 40 and faces rearwardly so as to be visible through the rear window 80. If desired, the housing 30 of the combination lamp 10 may be mounted to the package tray 40 or integrated thereto during the manufacture of the package tray 40 to form an integrated assembly which is installed into the vehicle on the vehicle assembly line as a preassembled unit.

Figure 3:
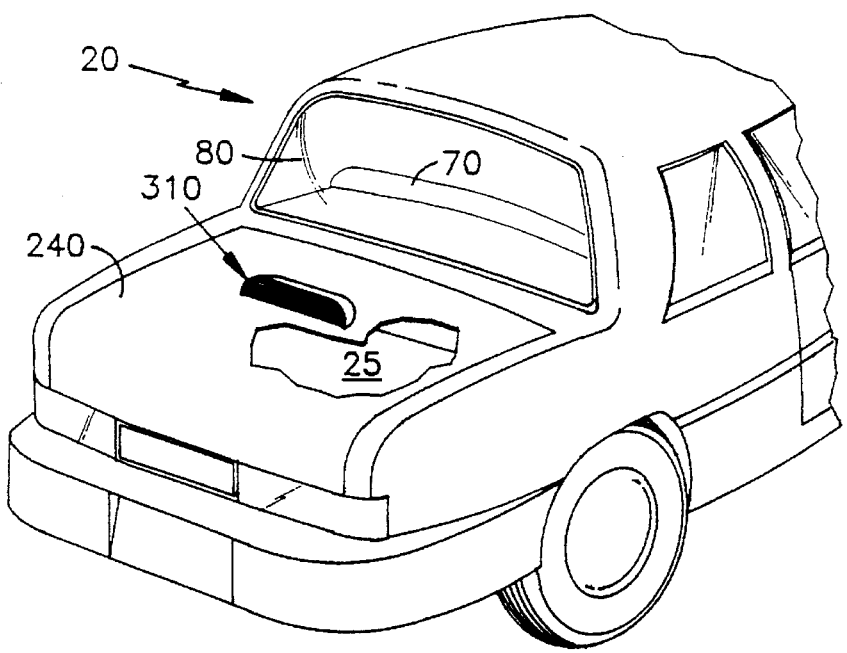
FIG. 3 is a perspective view of the rear portion of a vehicle illustrating an alternate embodiment of the combination brake/trunk illumination lamp of FIG. 2 mounted on the vehicle.

In the embodiment depicted in FIG. 3, the combination lamp 310 is disposed on the exterior of the automobile 20 and, as a conventional trunk mounted stop light, is mounted to the surface of the trunk lid 240. The enclosed trunk storage region 25, disposed rearwardly of the rearward-most seat 70, is covered by the trunk lid 240, which is movably mounted, typically in a hinged manner, to the automobile so as to be disposed over the trunk storage region 25 when in a closed position and be moveable from the closed position to an open position to provide access to the trunk storage region 25.

The housing 30 of the combination lamp 310 is mounted over an opening in the trunk lid 240 so that the second lens 60 faces downwardly into the trunk storage region 25 and the first lens 50 extends above the upper surface of the package tray 40 and faces rearwardly. If desired, the housing of the combination lamp 310 may be mounted to the trunk lid 240 during the manufacture of the trunk lid to form an integrated assembly which is installed onto the vehicle on the vehicle assembly line as a preassembled unit.

The first lens 50 of the combination lamp 10, 310 functionally comprises a stop light lens and is therefore a red colored lens. The second lens 60 of the combination lamp 10, 310 functionally comprises a trunk courtesy lamp lens and is therefore advantageously a clear or a neutral color lens. Both lenses 50 and 60 are conventional lenses, typically made of translucent plastic, and may be flat, arcuate, Fresnel or of any other desired design.

Figure 4:
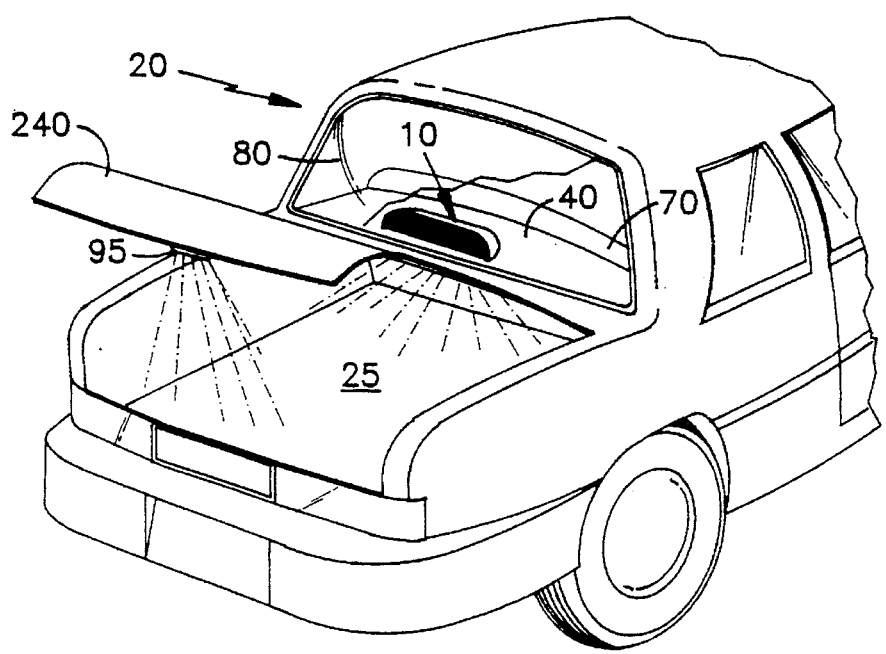
FIG. 4 is a perspective view of the rear portion of the vehicle of FIG. 1 with the trunk lid open.

Although the operation of the lighting apparatus of the present invention as a trunk illumination lamp will be discussed with reference to FIG. 4 wherein the lighting apparatus of the present invention is shown mounted in its embodiment as a center high mount brake lamp 10 as shown in FIG. 1, it is to be understood that the following description of operation is equally applicable to the embodiment of FIG. 3 wherein the combination lamp 310 is mounted on the exterior of the trunk lid 240. In operation, in addition to being energized whenever the brake of the vehicle is depressed, the lighting element 35 of the combination lamp 10 is energized whenever the trunk lid 240 is open, thereby producing light which will pass through the lens 60 to illuminate the trunk storage region 25. Additionally, the vehicle's license plate lamps 95 may also be modified to be energized when the trunk lid 240 is opened, even if the vehicle's headlights are off, to provide further illumination of the area around the trunk storage region 25.

As will be apparent to persons skilled in the art, various modifications and adaptations of the lighting apparatus hereinbefore described and the manner in which it may be applied to an automobile or other vehicle will become readily apparent without departure from the spirit and scope of the invention, the scope of which is defined in the appended claims.

I claim:

1. A lighting apparatus for use in an automobile having a passenger cabin having a rearward-most seat, an enclosed trunk space disposed rearwardly of the rearward-most seat and having a hinged trunk lid disposed over the trunk space when in a closed position and moveable from the closed position to an open position to provide access to the trunk space, and a rear package tray disposed within the passenger cabin rearwardly adjacent the rearward-most seat and above a forward portion of the trunk space, said lighting apparatus comprising:

a housing mounted to an upper surface of the package tray over an opening in the package tray, said housing having a rearward facing wall having an opening disposed above the package tray and visible from behind the automobile and a downward facing wall having an opening disposed above the forward portion of the trunk space;

a first lens disposed in the opening in the rearward facing wall of said housing;

a second lens disposed in the opening in the downward facing wall of said housing; and lamp means disposed within said housing, said lamp means being selectively operative to illuminate when a brake pedal of the automobile is depressed and when the trunk lid is in an open position.

2. A lighting apparatus as recited in claim 1 wherein said first lens is a red colored translucent lens and said second lens is a clear translucent lens.

3. A lighting apparatus as recited in claim 6 wherein said lighting element and said first lens in combination comprise a brake light.

4. A lighting apparatus as recited in claim 1 wherein said lighting element and said second lens in combination comprise an illumination light for illuminating the storage region of the vehicle.

* * * * *